US010487186B2

(12) United States Patent
Poncelet et al.

(10) Patent No.: US 10,487,186 B2
(45) Date of Patent: Nov. 26, 2019

(54) PROCESS FOR TREATING SILICA-FILLED POLYAMIDE BY IMPREGNATION IN SUPERCRITICAL CO2

(71) Applicant: COMMISSARIAT A L'ENERGIE ATOMIQUE ET AUX ENERGIES ALTERNATIVES, Paris (FR)

(72) Inventors: Olivier Poncelet, Grenoble (FR); Daniel Getto, Le Fontanil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/345,346

(22) PCT Filed: Oct. 27, 2017

(86) PCT No.: PCT/EP2017/077636

§ 371 (c)(1),
(2) Date: Apr. 26, 2019

(87) PCT Pub. No.: WO2018/078114

PCT Pub. Date: May 3, 2018

(65) Prior Publication Data

US 2019/0248973 A1 Aug. 15, 2019

(30) Foreign Application Priority Data

Oct. 27, 2016 (FR) ..................................... 16 60457

(51) Int. Cl.

| | |
|---|---|
| ***C08J 7/02*** | (2006.01) |
| ***B29C 71/00*** | (2006.01) |
| ***C08K 3/36*** | (2006.01) |
| ***H01B 3/30*** | (2006.01) |
| ***H01H 33/02*** | (2006.01) |
| ***C08L 77/02*** | (2006.01) |
| ***C08L 77/10*** | (2006.01) |

(52) U.S. Cl.

CPC ............. *C08J 7/02* (2013.01); *B29C 71/0009* (2013.01); *C08K 3/36* (2013.01); *C08L 77/02* (2013.01); *C08L 77/10* (2013.01); *H01B 3/305* (2013.01); *H01H 33/021* (2013.01); *B29C 2071/0054* (2013.01); *C08J 2377/02* (2013.01); *C08J 2377/10* (2013.01); *C08J 2483/04* (2013.01)

(58) Field of Classification Search

CPC ...... C08J 7/02; C08J 2483/04; C08J 2377/06; C08K 3/36; C08L 77/02; C08L 77/10; H01B 3/305; H01B 3/46; Y02P 20/544; B29C 2071/0054

USPC ...................................................... 174/120 R

See application file for complete search history.

(56) References Cited

U.S. PATENT DOCUMENTS

| | | | | |
|---|---|---|---|---|
| 2005/0058835 A1 | 3/2005 | Howdle et al. | | |
| 2010/0137479 A1 | 6/2010 | Couillens et al. | | |
| 2017/0226326 A1 * | 8/2017 | Takeuchi | ................. | C08K 9/06 |

FOREIGN PATENT DOCUMENTS

| | | |
|---|---|---|
| EP | 3 023 996 A1 | 5/2016 |
| FR | 2 975 820 A1 | 11/2012 |
| FR | 2 975 836 A1 | 11/2012 |
| FR | 2 988 215 A1 | 9/2013 |
| WO | WO 03/045448 A1 | 6/2003 |
| WO | WO 2008/055872 A1 | 5/2008 |
| WO | WO 2016/128571 A1 | 8/2016 |

OTHER PUBLICATIONS

International Search Report dated Jan. 31, 2018, in PCT/EP2017/077636 filed on Oct. 27, 2017.

Preliminary French Search Report dated Jun. 21, 2017, in FR 1660457 filed on Oct. 27, 2016.

Laredo, E. et al., "Water Absorption Effect on the Dynamic Properties of Nylon-6 by Dielectric Spectroscopy", Macromolecules, 2003, vol. 36, pp. 9840-9850.

Cooper, A. I., "Polymer synthesis and processing using supercritical carbon dioxide", Journal of Materials Chemistry, 2000, vol. 10, pp. 207-234.

Elmaaty, T. A. et al., "Eco-Friendly Disperse Dyeing and Functional Finishing of Nylon 6 Using Supercritical Carbon Dioxide", Fibers, 2015, vol. 3, pp. 309-322; doi:10.3390/fib3030309.

* cited by examiner

*Primary Examiner* — Sherman Ng

(74) *Attorney, Agent, or Firm* — Oblon, McClelland, Maier & Neustadt, L.L.P.

(57) ABSTRACT

The present invention relates to a process for treating a polyamide-based material comprising silica fibers and/or fillers, by impregnation with at least one hydrophobic additive in supercritical $CO_2$.

The invention also relates to a polyamide-based material comprising silica fibers and/or fillers and impregnated with at least one hydrophobic additive, obtained via such a process, and to the use thereof as an electrically insulating component in an electrical device, in particular in a circuit breaker.

21 Claims, No Drawings

PROCESS FOR TREATING SILICA-FILLED POLYAMIDE BY IMPREGNATION IN SUPERCRITICAL CO2

The present invention relates to a novel method for treating a silica-filled polyamide article.

In electrical devices, in particular medium-voltage or high-voltage devices, the electrically insulating component(s) may especially be made of polyamides (for example polyamide 6,6 or polyphthalamide), comprising reinforcers, typically glass fibers and/or silica fillers. This is the case especially for the dielectric part of medium-voltage circuit breakers, formed from polyamide 6,6, filled with from 30% to 50% by weight of micrometric silica yarns, sold by the company Schneider Electric. These circuit breakers have a service life of more than 20 years. Throughout the life of the circuit breaker, thousands of breakdown tests are performed, generally two a day, and these tests very greatly mechanically stress the filled polymer. The combination of polyamide 6,6 with micrometric silica fibers made it possible to achieve the desired mechanical performance qualities over the entire service life of the circuit breaker and at a competitive cost.

In medium-voltage or high-voltage electrical devices, such as circuit breakers, the electrical insulation and electric-arc extinction functions are typically performed by an insulating gas which is confined inside the device.

At the present time, the gas most commonly used in this type of device is sulfur hexafluoride ($SF_6$). The reason for this is that this inert gas has a relatively high dielectric stiffness, good thermal conductivity and quite low dielectric losses. After having been dissociated by an electric arc, it recombines rapidly and almost entirely. Furthermore, it is nonflammable and of moderate price.

However, sulfur hexafluoride has a certain level of environmental unfriendliness. It thus has a global warming potential (GWP) of 22 800 (relative to $CO_2$ over 100 years) and a residence time in the atmosphere of 3200 years, which places it among the gases with a high greenhouse-effect power.

Consequently, the use of $SF_6$ will be regulated, or even prohibited, which has led manufacturers to look for alternatives to $SF_6$.

As a replacement for, it has thus been proposed to use various alternative gaseous media, which, whilst having good electrical insulation and electric-arc extinction properties, have a low environmental impact.

Mention may be made, for example, of the gaseous media described in FR 2 988 215, FR 2 975 820 and FR 2 975 836, and especially a dilution gas mixture such as dry air and a fluoro ketone.

However, this change in the nature of the insulating gas of electrical devices poses problems, especially in terms of the surface dielectric strength of the electrically insulating component(s).

In point of fact, it is known that polyamides such as polyamide 6,6 naturally have great affinity for water. A non-filled polyamide may take up up to 7% by mass of water. However, the presence of excess water greatly modifies the mechanical properties. Paradoxically, the exceptional mechanical properties of polyamide are due to the presence of structural water molecules which act as a plasticizer [1]. A compromise was thus found by filling polyamide with silica, typically micrometric silica fibers. The maximum water uptake is then of the order of 2% to 3% by mass.

However, the presence, at the surface of molded or injected polyamide parts, of silica fibers, projecting at the surface of the electrically insulating component, causes "peak effects" which initiate breakdown between the electrodes.

Now, this phenomenon is exacerbated as a function of the nature of the atmosphere in which the circuit breaker is immersed. For example, the electrical stiffness of dry air relative to $SF_6$ is 2.3 times higher, but this stiffness is greatly degraded as a function of the moisture content.

Consequently, the current components based on silica-filled polyamide cannot be used in a gaseous medium such as dry air and/or fluoro ketone, due to the change in their dielectric properties.

To overcome the drawbacks associated with the replacement of sulfur hexafluoride with other gaseous media in electrical devices, it appears necessary to limit the water uptake of silica-filled polyamide parts.

A first route for overcoming these drawbacks would be to replace the generally used polyamide 6,6 by an aromatic polyamide that is naturally more hydrophobic, but also more expensive. This also involves performing long qualification and homologation tests, without any assurance that the mechanical properties will be equivalent to those of polyamide 6,6. Also, it may be expected that these aromatic polyamides would be very sensitive to the UV emitted during the breakdown tests and would be prematurely degraded.

Another alternative would be to modify, via a suitable treatment, the silica-filled polyamide injected or molded parts, so as to limit the water uptake of the polymer matrix.

The present invention is precisely directed toward proposing a suitable treatment for limiting the water uptake of silica-filled polyamide-based materials.

More particularly, the present invention proposes to use supercritical carbon dioxide (also known as supercritical $CO_2$ or $sCO_2$) as a vector for the impregnation of the silica-filled polyamide-based material with a hydrophobic additive, such as a silicone oil.

Thus, according to a first of its aspects, the invention relates to a process for treating a polyamide-based material comprising at least silica fibers and/or fillers, by impregnation with at least one hydrophobic additive in supercritical $CO_2$.

The treatment process according to the invention is more particularly intended to reduce the water uptake of said material.

The hydrophobic additive is advantageously a silicone oil which is soluble in supercritical $CO_2$. It may also be a fluoro compound, for example of urea type. The hydrophobic additives that may be used for the impregnation of the material according to the invention are more particularly detailed in the text hereinbelow.

For the purposes of the invention, the term "supercritical $CO_2$" means $CO_2$ used at a temperature and pressure above their critical value.

Supercritical $CO_2$ is generally used industrially in extraction or purification processes. More precisely, it corresponds to a fluid obtained by subjecting carbon dioxide to a temperature of at least 31° C. and a pressure of at least 74 bar. It is particularly advantageous with regard to its cost, its ease of use, its nonflammability, its nontoxicity and its solvent properties.

In addition, and in contrast with organic solvents, supercritical $CO_2$ does not require a recycling or treatment step after its use. In point of fact, carbon dioxide may be released in gaseous form on conclusion of the treatment. Finally, the impregnation process according to the invention does not require an additional drying step after the impregnation step.

Supercritical $CO_2$ is already used as a solvent medium for polymer synthesis [2]. Moreover, supercritical $CO_2$ has been proposed, as an alternative to aqueous solvents, for the dyeing of textiles [3] or of papers.

However, to the inventors' knowledge, the use of supercritical $CO_2$ has never yet been proposed for reducing the water uptake of the material of an electrically insulating component of an electrical device according to the invention, based on polyamide(s) filled with silica fibers and/or silica fillers.

The treatment process according to the invention proves to be particularly advantageous in several respects.

Firstly, as illustrated in the examples that follow, it makes it possible to significantly reduce the water uptake of said silica-filled polyamide material.

Without wishing to be bound by the theory, since supercritical $CO_2$ is a dense gas, the $CO_2$ molecules have no affinity for the water molecules trapped in the porosities of the polymer. On the other hand, they can mechanically "chase away" said molecules from the polymer and empty the "hydrophilic" pores by filling them with the hydrophobic additive used, for example silicone oil. The polyamide swells readily in supercritical $CO_2$, the latter then being able to diffuse in the polymer matrix, conveying the desired additive.

The impregnation treatment according to the invention with the hydrophobic additive using supercritical $CO_2$ thus advantageously allows a deep-down hydrophobic treatment of the material, and thus makes it possible to significantly increase the hydrophobicity of the material.

The term "impregnation" means that the treatment allows the presence of the hydrophobic additive within the material. The hydrophobic additive is more particularly "trapped" in the polymer matrix or network.

More particularly, the treatment process according to the invention makes it possible to impregnate the material with said hydrophobic additive(s) to a thickness extending from the surface of the material down to a depth of at least 200 μm, in particular up to at least 300 μm in depth and more particularly up to at least 400 μm in depth. Impregnation of the material over such a thickness is sufficient to provide a long-lasting effect of protection against water and of resistance to handling (scratch resistance).

The material impregnated with the hydrophobic additive, obtained on conclusion of the process of the invention, thus has a reduced water uptake when compared with the untreated material. In other words, it has improved hydrophobicity.

The "water uptake" reflects the varying amount of water which may be absorbed by the material. It may be expressed by the ratio of the weight increase of the material after immersion in water relative to its initial weight. As detailed in the examples that follow, the water uptake may more particularly consist in placing the samples of material dried beforehand, under given relative humidity conditions and for a predefined time (for example immersion in water at 90° C. for three weeks); the material becomes hydrated, which makes the mass of the sample go from an initial value m (in the dried state) to a final value ($m+\delta m$). The term "water uptake" of the material will specifically denote the ratio $\delta m/m$ expressed as a percentage.

In particular, as illustrated in the examples that follow, the water uptake of the material is advantageously less than or equal to 1%, in particular less than or equal to 0.7% and more particularly less than or equal to 0.5%.

In this respect, impregnation using supercritical $CO_2$ proves to be more efficient than impregnation by hydrostatic pressure.

Also, in comparison with an impregnation treatment by hydrostatic pressure, the process of the invention using supercritical $CO_2$ is easier for the treatment of complex geometrical parts, and requires a reduced amount of hydrophobic additive.

Moreover, the impregnation treatment is advantageously stable over time. In other words, the impregnated material conserves over time its improved properties in terms of hydrophobicity, in other words reduced water uptake.

Consequently, the electrically insulating components made from a material impregnated according to the invention have good properties, especially in terms of surface dielectric strength, even though they are used with a gaseous medium other than $SF_6$, for instance a mixture of dry air and of a fluoro ketone.

Finally, the impregnation treatment according to the invention of silica-filled polyamide-based components does not affect their mechanical properties.

According to another of its aspects, the invention thus relates to a polyamide-based material comprising silica fibers and/or fillers, and impregnated with at least one hydrophobic additive, obtained on conclusion of the impregnation process of the invention.

According to another of its aspects, the invention also relates to an electrically insulating component, used in particular in an electrical device, formed totally or partly from a material impregnated according to the process of the invention.

Other characteristics, variants and advantages of the process according to the invention will emerge more clearly on reading the description and the examples that follow, which are given as nonlimiting illustrations of the invention.

In the continuation of the text, the expressions "between . . . and . . . ", "ranging from . . . to . . . " and "varying from . . . to . . . " are equivalent and are intended to mean that the limits are included, unless otherwise mentioned.

Unless otherwise indicated, the expression "including/comprising a(n)" should be understood as "including/comprising at least one".

Material Based on Silica-Filled Polyamide

As mentioned above, the material under consideration according to the invention is a material based on polyamide(s) comprising silica fibers and/or fillers.

A material impregnated according to the invention may more particularly constitute all or part of an electrically insulating component, in particular used in an electrical device such as a circuit breaker.

The process of the invention may, for example, be performed directly on directly usable molded or injected parts such as insulating electrical components in electrical devices, for example medium-voltage or high-voltage electrical devices, as described in the continuation of the text. In this respect, the polyamide-based material may be in various forms.

It may or may not be flat. It may, for example, be in the form of a film or layer with a thickness of between 2 mm and 1 cm, in particular between 3 mm and 5 mm.

The term "polyamide-based material" means that the material includes, by mass, at least 50% and preferably at least 60% of polyamide(s).

The term "polyamide(s)" denotes one or more polymers containing amide functions resulting from a polycondensation reaction between carboxylic acids and amines.

These polyamides may be aliphatic (PA), semiaromatic (polyphthalamide, PPA) or aromatic (PAA) homopolymers or copolymers.

As examples of polyamides according to the invention, mention may be made of polyamide 6, polyamide 6,6; polyamide 11, polyamide 12, polyamide 4.5; 6.10 and 6.12; semiaromatic polyamides such as polyphthalamides, and mixtures thereof.

According to one particular embodiment, the material is based on polyamide 6,6.

According to another particular embodiment, the material is based on polyphthalamide (or PPA), which is known as "high-performance" polyamide on account of its excellent mechanical properties and resistance to high temperatures.

The polyamide-based material according to the invention comprises at least silica fibers (also known as "glass fibers"), silica fillers or a mixture of silica fibers and fillers.

The silica fibers and/or fillers are of micrometric size. Typically, the silica fibers may have a diameter of between 20 and 70 μm and a length of several hundred micrometers.

These silica fibers and/or fillers present in the polyamide-based material of an electrically insulating component are known as "reinforcers". Preferably, they are micrometric silica fibers.

According to a particular embodiment, the material to be treated according to the invention is based on polyamide, in particular on polyamide 6,6 or on polyphthalamide, filled with micrometric silica fibers.

The material to be treated may comprise silica fibers and/or fillers, in particular silica fibers, in a mass proportion of greater than or equal to 20%, in particular greater than or equal to 30% and more particularly between 30% and 50% of the total mass of said material.

Advantageously, the material comprises a mass proportion of silica fibers of about 50% of the total mass of the material. A high proportion of silica makes it possible to reduce the cost of the material, silica generally being cheaper than the polyamides.

The polyamide-based material may also optionally comprise reinforcers other than silica fillers and/or fibers.

The nature of the reinforcers is appropriately chosen so as not to affect the dielectric properties of the material.

They may be, for example, organic fibers, such as polymer fibers, for example polyester or aramid fibers.

The fillers may be organic or mineral. Examples that may be mentioned include hexagonal boron nitrides or alpha-aluminas.

The reinforcers may be constituted of a mixture of fibers and fillers.

According to a particular embodiment, the polyamide material filled with silica fibers is, prior to the impregnation treatment, subjected to a heat treatment suitable for removing the water absorbed at the surface and at the base of the micrometric silica fibers which project from the surface of the polyamide material.

This heat treatment may be performed, for example, by subjecting the material to a temperature of between 50° C. and 100° C., in particular about 90° C.

The duration of the heat treatment may be between 5 hours and 48 hours, and in particular may be about 36 hours.

Hydrophobic Additive

As mentioned previously, the process of the invention performs the impregnation of the material with one or more hydrophobic additives.

It is understood that the nature of the hydrophobic additive is chosen with regard to its ability to be able to impregnate the polyamide-based material under the impregnation conditions in supercritical $CO_2$ according to the invention.

The term "hydrophobic" means that the additive used has a solubility in water at 25° C. of less than 0.001% by weight.

In particular, the hydrophobic additive used to impregnate the polyamide material has good solubility in supercritical $CO_2$.

The term "soluble" in supercritical $CO_2$ means that it is possible to dissolve said additive to a proportion of at least 1 g of additive per 8 g of supercritical $CO_2$.

Preferably, the hydrophobic additive is such that the ratio of the mass of the dissolved additive to the mass of supercritical $CO_2$ is between 1/10 and 1/8.

Preferably, the hydrophobic additive is soluble in supercritical $CO_2$ for temperature conditions of less than 130° C., in particular between 50 and 100° C., and for a pressure of between 250 and 450 bar.

In point of fact, temperatures that are excessively high during the treatment of the parts treated according to the invention would be liable to cause deformation of the parts during the swelling of the polyamide material with the supercritical fluid. In addition, excessively high pressures would make it difficult to use the autoclave for performing the impregnation treatment.

According to a particularly preferred embodiment, the hydrophobic additive may have dielectric properties. In particular, in the case of producing a material for which very good dielectric strength is required, the hydrophobic additive used is chosen from compounds which have good dielectric properties.

Advantageously, the hydrophobic additive has a dielectric constant of less than or equal to 3. This is the case especially for the silicone oils and the fluoro compounds described in the continuation of the text.

The dielectric constant may be measured via techniques known to those skilled in the art, for example via the use of a capacitive probe of VEGACAL type calibrated with liquids whose dielectric constant is known.

Moreover, advantageously, the hydrophobic additive used has good affinity for the polyamide-based material.

For example, the hydrophobic additive may establish with the polyamide matrix interactions of hydrogen bonding type or Van der Waals interactions.

Such affinity of the hydrophobic additive for the polymer matrix thus makes it possible to ensure that the hydrophobic additive remains within the polyamide matrix of the material impregnated according to the invention, in particular that it does not desorb from the matrix, for example during depressurization of the autoclave used for the impregnation treatment, and/or over time.

Finally, advantageously, the hydrophobic additive has good stability over time so as to allow a long-lasting hydrophobic treatment of the material.

Preferably, the hydrophobic additive is, at the temperature and pressure used for the impregnation, in the form of a more or less viscous fluid.

In particular, the hydrophobic additive preferably has a viscosity at 25° C. of between 20 mPa·s and 600 mPa·s, in particular between 50 mPa·s and 400 mPa·s. The viscosity may be measured, for example, using a BROOKFIELD viscometer.

The hydrophobic additive used in the impregnation process according to the invention may be chosen more particularly from the silicone oils and fluoro compounds as described below.

Silicone Oils

The hydrophobic additive may be chosen, according to a first implementation variant, from silicone oils, especially dielectric silicone oils which are soluble in supercritical $CO_2$.

Dielectric silicone oils are known for their use as dielectric fluids in electrical devices.

Preferably, the silicone oil has a viscosity, at 25° C., of between 20 and 600 mPa·s, in particular between 20 and 400 mPa·s and preferably between 50 and 300 mPa·s. The viscosity may be measured, for example, using a Brookfield viscometer.

Hydrophobic silicone oils that may be used include linear silicone oils of polydimethylsiloxane type.

Mention may be made, for example, of the linear silicone oils sold by the company Clearco under the "PSF Fluids" name (meaning "polydimethylsiloxane fluids"). These silicone oils have good dielectric properties. They may have viscosities at 25° C. of between 0.65 cSt and 20 cSt (sold under the name "PSF-Low Viscosities"), between 50 cSt and 1000 cSt (sold under the name "PSF-Standard Viscosities") or between 5000 cSt and 100 000 cSt (sold under the name "PSF-High Viscosities").

The silicone oils may also be chosen from aromatic silicone oils.

The silicone oil may be chosen more particularly from polyaryl/alkylsiloxanes, in particular from polyphenyl/alkylsiloxanes such as polyphenyl/methylsiloxane and polyphenyl/propylsiloxane.

These oils advantageously have very good chemical stability, in other words good resistance to aging.

Preferably, the silicone oil used is sparingly polar. In particular, it does not comprise any hydroxyl end groups. The reason for this is that silicone oils bearing OH end functions form emulsions in supercritical $CO_2$. These emulsions remain at the surface of the polyamide material, forming a gel which foams substantially during the return to ambient pressure and ambient temperature.

According to a particularly preferred embodiment, the silicone oil used as hydrophobic additive is an oil of polyphenyl/alkylsiloxane type having the structure (I) below:

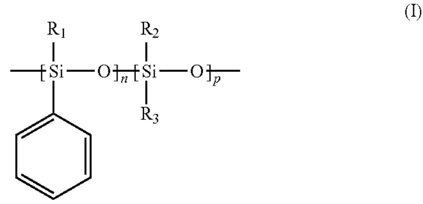

(I)

in which:

$R_1$ represents a phenyl radical or a $C_1$-$C_6$ alkyl radical, in particular a methyl or propyl radical, especially a methyl radical;

$R_2$ and $R_3$ represent, independently of each other, a $C_1$-$C_6$ alkyl radical, in particular a methyl or propyl radical, especially a methyl radical; and n and p are such that the silicone oil has a viscosity at 25° C. as specified previously.

In particular, the aromatic silicone oil may be chosen from the oils poly(dimethylsiloxane-co-methylphenylsiloxane) (CAS No.: 63148-52-7) and poly(dimethylsiloxane-co-diphenylsiloxane) (CAS No.: 68083-14-7).

Examples that may be mentioned include the silicone oils of polyphenyl/methylsiloxane type sold under the names "Silicone Oil AR 200" and "Silicone Oil AR 20" by the company Dow Corning, or under the grades "DPDM-400" and "PM-125 Phenylmethyl" by the company Clearco.

Fluoro Compounds

According to another implementation variant, the hydrophobic additive may be chosen from hydrophobic fluoro compounds which are soluble in supercritical $CO_2$.

It is known that supercritical $CO_2$ is an excellent solvent for fluoro compounds.

The fluoro compounds are more particularly chosen from compounds containing at least one at least partially fluorinated, in particular totally fluorinated, hydrophobic hydrocarbon-based chain, containing at least 6 carbon atoms, preferably at least 8 carbon atoms.

Preferably, the fluoro compounds contain at least one at least partially fluorinated hydrophobic hydrocarbon-based chain and at least one group which is capable of ensuring attachment of the fluoro compound to the polyamide network, in particular a group which is capable of interacting by hydrogen bonding or by Van der Waals interaction with the polyamide chains.

Such a group makes it possible to ensure that the hydrophobic additive remains in the polyamide matrix, even after depressurization of the autoclave and/or over time.

Such a group may be, for example, an —NH—C(O)—O— group (carbamate compounds), —NH—C(O)— group (amide compounds) or —NH—C(O)—NH— group (urea compounds).

Preferably, the hydrophobic hydrocarbon-based chain is a saturated or unsaturated, preferably saturated, linear or branched aliphatic chain, comprising at least 6 carbon atoms, said chain being at least partially fluorinated.

In particular, the hydrophobic hydrocarbon-based chain may contain at least 8 carbon atoms, in particular between 8 and 16 carbon atoms, preferably between 10 and 12 carbon atoms.

Preferably, at least 2 out of 5 carbon atoms of the hydrocarbon-based chain, in particular at least 1 out of 2 carbon atoms of the hydrocarbon-based chain, bears one or two fluorine atoms.

According to a particular embodiment, the hydrocarbon-based chain is totally fluorinated (perfluoro chain). Compounds having a perfluoro chain are advantageously less expensive than compounds bearing a partially fluorinated chain.

The hydrophobic hydrocarbon-based chain of the fluoro compound may also optionally bear one or more chlorine atoms.

According to a particular embodiment, the fluoro compound used as hydrophobic additive according to the process of the invention is of formula (II) below:

$$R_1—NH—C(=O)—R_2 \qquad (II)$$

in which:

$R_2$ represents:

(a) a group $—OR_3$ (compounds of carbamate type)

(b) a group $—R_3$ (compounds of amide type); or (c) a group $—NHR_3$ (compounds of urea type);

at least one from among $R_1$ and $R_3$ represents an at least partially fluorinated hydrophobic hydrocarbon-based chain, in particular as defined previously;

preferably, one from among $R_1$ and $R_3$ represents a hydrocarbon-based chain including at least six carbon atoms, in particular at least 10 carbon atoms, and in which at least 2 out of 5 carbon atoms of the hydrocarbon-based chain, in particular at least 1 out of 2 carbon atoms of the hydrocarbon-based chain, bears one or two fluorine atoms;

the other from among $R_1$ and $R_3$ represents an optionally substituted $C_{1-20}$-alkyl or $C_{1-20}$-alkenyl group, preferably a $C_{6-20}$-alkyl group, said group optionally bearing one or more chlorine atoms.

Preferably, the fluoro compound used as hydrophobic additive according to the process of the invention is of the abovementioned formula (II), in which $R_2$ represents a group —$OR_3$, a group —$R_3$ or a group —$NHR_3$ with $R_3$ representing an at least partially fluorinated hydrophobic hydrocarbon-based chain as defined previously.

The fluoro compounds that may be used as hydrophobic additives according to the process of the invention may be obtained via synthetic methods known to those skilled in the art.

For example, the fluoro compounds of the abovementioned formula (II) may be readily obtained by reaction between a compound of isocyanate $R_1$—N═C═O type and a compound of alcohol ($R_3$—OH), carboxylic acid ($R_3$—COOH) or amine ($R_3$—$NH_2$) type, according to the following reaction schemes:

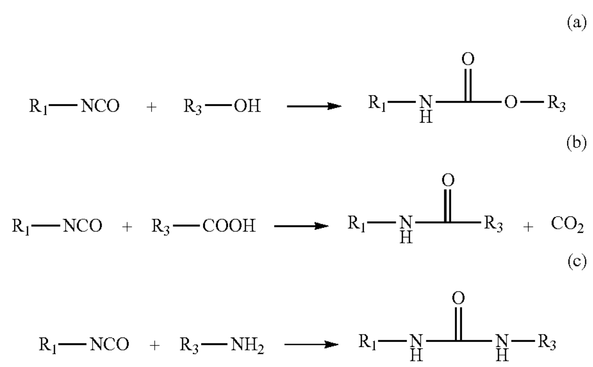

By way of example, Example 3 which follows illustrates the impregnation of a material according to the invention in supercritical $CO_2$ with a fluoro compound of urea type (N-decyl-N'-perfluorodecylurea).

Needless to say, the invention is not limited to the hydrophobic additives specifically described above. Other hydrophobic additives may be envisaged, provided that they are suitable for the impregnation in supercritical $CO_2$ of the silica-filled polyamide material.

According to a particular embodiment, the hydrophobic additive(s) used according to the invention are other than dyes.

It falls to a person skilled in the art to adjust the amount of hydrophobic additive(s) used, especially with regard to the volume of the polyamide-based material to be treated.

Typically, the amount of hydrophobic additive(s) used may be between 0.2% and 5% by weight relative to the mass of polyamide-based material to be impregnated, in particular between 0.5% and 3% by weight.

Impregnation Treatment

The impregnation treatment in supercritical $CO_2$ may be performed using any device known to those skilled in the art and suitable for the use of a supercritical solvent.

Advantageously, the impregnation process is performed in the absence of additional solvent. In other words, the only solvent present during the impregnation according to the invention is $CO_2$ in supercritical state.

The use of supercritical $CO_2$ thus avoids the use of an organic solvent which would then need to be removed from the impregnated material obtained.

Impregnation of the material with the hydrophobic additive using supercritical $CO_2$ may thus be performed via at least the steps consisting in:

(i) depositing a silica-filled polyamide-based material to be treated;

(ii) keeping the material to be treated in supercritical $CO_2$ in the presence of the hydrophobic additive, under conditions suitable for the impregnation of the material with the hydrophobic additive; and (iii) recovering the material impregnated with said hydrophobic additive.

Typically, the impregnation process of the invention is performed in a closed reactor, in particular an autoclave.

Thus, according to a particular embodiment, the process of the invention comprises at least the following steps:

placing a silica-filled polyamide-based material and at least one hydrophobic additive in an autoclave;

generating supercritical carbon dioxide in the autoclave;

keeping the material in the autoclave in the presence of the supercritical $CO_2$ and of the hydrophobic additive so as to ensure the impregnation of the material with said hydrophobic additive;

recovering the impregnated material by depressurization of the autoclave; and optionally, drying the material thus impregnated.

The impregnation of the polyimide material with the hydrophobic additive is ensured by keeping the carbon dioxide in supercritical form. This allows very rapid diffusion of the hydrophobic additive into the substrate, typically within a few minutes.

The impregnation temperature may especially be between 50° C. and 150° C., in particular between 80 and 120° C. and more particularly between 90 and 100° C.

The pressure during the impregnation may be between 80 and 450 bar, in particular between 150 and 400 bar and more particularly between 200 and 350 bar.

The duration of the impregnation treatment may be between 30 and 180 minutes and especially between 60 and 135 minutes.

According to a particular embodiment, the impregnation treatment is performed by keeping the autoclave at a temperature of between 80 and 100° C., at a pressure of between 250 and 300 bar, and doing so for 60 to 120 minutes.

The step which consists in depressurizing the autoclave more precisely consists in depressurizing down to atmospheric pressure and in removing the carbon dioxide (preferentially in gaseous form). It is advantageously performed at a temperature which ensures the phase transition from supercritical $CO_2$ to gaseous $CO_2$, avoiding the liquid phase of $CO_2$. This step is thus advantageously performed at a temperature of between 45 and 85° C. In particular, it may be performed at a temperature of between 60 and 70° C.

According to a particular embodiment, the depressurization temperature of the autoclave is advantageously the temperature at which the impregnation treatment is performed.

During the emptying of the autoclave, the conditions are such that, advantageously, the autoclave does not comprise any liquid $CO_2$.

In general, the autoclave depressurization time is between 20 and 120 minutes, in particular between 30 and 90 minutes. Since this depressurization step is endothermic, it is performed slowly to avoid heat shocks.

During the depressurization of the autoclave (emptying step), the carbon dioxide in gaseous form is expelled from the interior of the polyamide-based material, whereas the hydrophobic additive remains trapped in the material.

The polyamide matrix is saturated with $CO_2$, which will take several days before becoming equilibrated with the atmospheric $CO_2$.

On conclusion of the pressure release, the maximum residual mass of $CO_2$ in the polyamide matrix is less than 5%.

The last step makes it possible to recover the impregnated material and optionally to separate it from the hydrophobic additive which has not impregnated the material. The residual hydrophobic additive may advantageously be recycled to impregnate new parts. The treatment process according to the invention thus makes it possible to minimize the residues.

On conclusion of the impregnation according to the invention, the silica-filled polyamide-based material more particularly comprises said hydrophobic additive(s) in a mass content of between 0.2% and 5%, in particular between 0.5% and 2% and more particularly between 0.8% and 1.2%, relative to the total weight of the material.

As indicated previously, the process of the invention makes it possible to impregnate the material with said hydrophobic additive(s) to a thickness extending from the surface of the material down to a depth of at least 200 μm, in particular of at least 300 μm and more particularly up to at least 400 μm in depth. Impregnation over such a thickness advantageously makes it possible to provide a long-lasting water-resistance effect.

As mentioned previously, the material impregnated according to the invention advantageously has reduced water uptake when compared with the untreated material.

The water uptake (δm/m, evaluated after immersion in water at 90° C. for 3 weeks) is advantageously less than or equal to 1%, in particular less than or equal to 0.8%, preferably less than or equal to 0.5%.

Applications

As mentioned previously, the silica-filled polyamide-based material treated according to the process of the invention may constitute all or part of an electrically insulating component, in particular used in electrical devices, in particular medium-voltage or high-voltage devices.

The terms "medium voltage" and "high voltage" are used in their usually accepted sense; namely, the term "medium voltage" denotes a voltage which is greater than 1000 volts in alternating current and than 1500 volts in direct current, but which does not exceed 52 000 volts in alternating current and 75 000 volts in direct current, whereas the term "high voltage" denotes a voltage which is strictly greater than 52 000 volts in alternating current and than 75 000 volts in direct current.

According to another of its aspects, the invention thus relates to an electrically insulating component, formed totally or partly from a material impregnated according to the process of the invention.

The electrically insulating components may especially be parts through which runs a current and which surround the conductors (bushing), the part surrounding the fuse, also known as the "fuse well", the contact-bearing shaft (also known as the mobile shaft), the insulator or the sealed enclosure especially comprising the gaseous medium ensuring the electrical insulation and the extinction of electric arcs that are liable to form within said sealed enclosure.

Thus, according to another of its aspects, the present invention relates to the use of an electrically insulating component formed totally or partly from a material impregnated according to the process described previously, in an electrical device.

The invention also relates to an electrical device, in particular a medium-voltage or high-voltage electrical device, such as a circuit breaker, comprising an electrically insulating component formed totally or partly from a material impregnated according to the process of the invention.

This electrical device may especially be a gas-insulated electrical transformer, for instance a power transformer or an instrument transformer. The electrical device may also be a an overhead or underground gas-insulated line, or a set of bars for transporting or distributing electricity. Finally, it may also be a connection/disconnection electrical device (also known as a breaking device), for instance a circuit breaker, a switch, an isolator switch, a switch-fuse combination, an earthing isolator switch or a contactor.

In general, these electrical devices are equipped with a sealed enclosure in which is found at least one electrically insulating component, electrical components and also a gaseous medium ensuring the electrical insulation and the extinction of electric arcs that are liable to form within this sealed enclosure.

As mentioned previously, this gaseous medium may be of varied nature, as described, for example, in FR 2 975 820, FR 2 988 215 and EP 3 023 996.

In particular, it may include at least one fluoro ketone, such as decafluoro-2-methylbutan-3-one (C5K). It may be, for example, a mixture of a carrier gas such as air, in particular dry air, and of a fluoro ketone.

The impregnation treatment of the process of the invention is, needless to say, performed before placing said insulating electrical component in the sealing enclosure of the electrical device.

The invention will now be described with the aid of the examples that follow, which are, needless to say, given as nonlimiting illustrations of the invention.

EXAMPLES

Materials and Method

Samples of Polyamide Filled With Silica Fibers

The tests were performed on samples of polyphthalamide filled with micrometric silica fibers (50% by mass) of GRIVORY HT2V-5H type supplied by the company Schneider Electric.

All the measurements were taken on at least six samples (plates: 3 mm×35 mm×65 mm).

To characterize the polyamide samples used, the following experiments were performed.

Samples of GRIVORY HT2V-5H polyamide were conditioned for 36 hours at 90° C. in an oven. The samples were weighed. Next, the samples were immersed in deionized water at 90° C. for 3 weeks.

After the 3 weeks, the samples are dried and weighed.

The water uptake (ratio of the weight increase δm of the material relative to its initial weight before immersion in water, average of the six samples) was measured as 2.3%.

The same batch of GRIVORY HT2V-5H polyamide samples, conditioned for 36 hours at 90° C. in an oven, was placed in steam (100° C.) for 1 hour. The calculated water uptake is then 2%.

These data are in accordance with the literature data and those communicated by Schneider Electric.

The protocol is the one known as the "breakthrough curve". The samples are placed in a high-pressure (300 bar) reactor filled with a liquid and the "hydrostatic" pressure of this liquid is raised by the action of a temperature-controlled pump (20-25° C.). With a filler mass content of 50% of silica fibers, the polyamide is studded with surface defects which leave glass fibers emerging up to 50 microns above the plane. At the base of these fibers, there are ridges and/or hollows 20 microns or more in depth. These hollows allow water to penetrate deep down. When these samples are immersed in a liquid and the pressure is increased, the liquid fills these cavities, first the large cavities and then the small ones. The capillary pressure opposes the penetration of the liquid. The hydrostatic pressure must thus be increased so as to "break through" this opposition. The process is thus performed in stages, each stage representing the breakthrough of a capillary radius domain.

The impregnation treatment in supercritical $CO_2$ was performed in an autoclave into which is introduced the hydrophobic additive.

The autoclave is filled with 500 g of liquid $CO_2$ via a pump until a pressure of 50 bar and a temperature of 5° C. are reached. The reactor is then heated by the joule effect so as to pass into the supercritical zone. The additive may be present in the reactor, or provided pure by a pump in the reactor.

Example 1 (Counterexample)

Impregnation at Hydrostatic Pressure with a Silicone Oil

Six samples of GRIVORY HT2V-5H polyamide were preconditioned for 36 hours at 90° C.

This preconditioning at 90° C. for 36 hours makes it possible to remove the water adsorbed onto the surface and at the base of the micrometric silica fibers which break through the surface.

The samples were subjected to a pressure of 250 bar in a silicone oil of polyphenyl/methylsiloxane type ("Silicone Oil AR 200" sold by Aldrich) for 12 hours at room temperature.

The samples were then dried.

Water Uptake Test

The samples were immersed in water at 90° C.

After three weeks, the water uptake (calculated as the ratio of the weight increase $\delta m$ of the material relative to its initial weight before immersion in water) is 1%.

Without wishing to be bound by the theory, when the samples are subjected to 250 bar, the silicone oil molecules are "pushed" into the surface porosities of the polyamide filled with silica fibers. However, since the silicone oil is very hydrophobic, it cannot enter pores which would have remained hydrophilic despite the preconditioning ([1]).

The six plates were stored in a desiccator at 90% RH (relative humidity) for one year at room temperature. The weight of the plates did not change. The plates are dry to the touch.

Example 2 (in Accordance with the Invention)

Impregnation with a Silicone Oil Using Supercritical $CO_2$

Six samples of Grivory HT2V-5H polyamide, preconditioned for 36 hours at 90° C., were subjected to a pressure of 250 bar at 90° C. of supercritical $CO_2$ in the presence of 0.5 ml of silicone oil ("Silicone Oil AR 200" sold by Aldrich) for 1 hour.

The samples were then dried.

Water Uptake Test

The samples were immersed in water at 90° C.

After three weeks, the water uptake, calculated as indicated previously, is 0.2%.

The six plates were stored in a desiccator at 90% RH (relative humidity) for one year at room temperature. The weight of the plates did not change. The plates are dry to the touch.

Conclusion

The impregnation treatment using supercritical $CO_2$ is more efficient, in comparison with an impregnation treatment at hydrostatic pressure. It makes it possible to significantly reduce the water uptake of the polyamide-based material.

The impregnated material conserves over time its improved properties in terms of low water uptake.

Similarly, samples of polyamide filled with silica fibers were treated with a silicone oil of lower kinematic viscosity (20 mPa·s instead of 200 mPa·s), the oil "Silicone Oil AR 20" sold by Aldrich.

Just as in Example 2, impregnation with the silicone oil under an atmosphere of supercritical $CO_2$ allowed a core hydrophobic treatment of the samples, which limited the water uptake.

The supercritical $CO_2$ treatment appears to be 3 to 5 times more efficient than impregnation by hydrostatic pressure.

Deposition by "dip-coating" at ambient pressure of silicone oil of the same grade forms a labile surface deposit which does not make it possible to increase the hydrophobicity of the Grivory plates.

An attempt was also made to perform an impregnation at 250 bar at 90° C. with hydrostatic pressure, by first raising the temperature and then the pressure, but the GRIVORY plates tested were highly deformed (flattened), the polymer having fluxed.

Example 3 (in Accordance with the Invention)

Impregnation with a Fluoro Compound Using Supercritical $CO_2$

Synthesis of the Fluoro Compound

A urea derivative (N-decyl-N'-perfluorodecylurea) was synthesized from perfluorodecylamine and decyl isocyanate.

The synthesis is performed at 5° C. in anhydrous ethyl ether (200 mL), followed by stirring for 5 hours at room temperature.

The reaction medium concentrated to 20 mL is transferred into an open glass tube with a cross section of 4 cm and a length of 5 mL. The medium is concentrated to dryness. The amount of urea derivative recovered is 2 g.

Impregnation Using Supercritical $CO_2$

The tube is placed in an autoclave with a working volume of 600 mL, in which are also placed six samples of GRIVORY HT2V-5H polyamide preconditioned for 36 hours at 90° C.

The autoclave is filled with liquid $CO_2$ (52 bar) and is then heated to obtain a temperature of 100° C. and a pressure of 300 bar. The impregnation treatment lasts two hours. The heating is then stopped and the system is decompressed over two hours.

Water Uptake Test

The treated samples are weighed and placed in an oven in water at 90° C. for three weeks. They are removed from the oven, dried for 30 minutes at 60° C. and then weighed again.

The water uptake, calculated as described previously, is 0.5%.

The reference samples coming from the same batch of material, but not impregnated, took up about 2.3% of water.

REFERENCES

[1] Laredo et al., Macromolecules, 2003, 36(26), 9840;
[2] Cooper, J. Mater. Chemistry, 2000, 10, 207-234;
[3] Tarek Abou Elmaaty et al., Fibers, 2015, 3, 309-322.

The invention claimed is:

1. A process for treating a polyamide-based material comprising silica fibers and/or fillers, the process comprising impregnating the polyamide-based material with at least one hydrophobic additive in supercritical $CO_2$.

2. The process of claim 1, comprising reducing water uptake of said material.

3. The process of claim 1, wherein the material is comprises polyamide 6,6 or on polyphthalamide filled with silica fibers and/or fillers.

4. The process of claim 1, wherein the material comprises silica fibers and/or fillers, in a mass proportion of greater than or equal to 20% of the total mass of the material.

5. The process of claim 1, wherein said material forms all or part of an electrically insulating component.

6. The process of claim 1, wherein the hydrophobic additive is chosen from dielectric silicone oils which are soluble in supercritical $CO_2$ and hydrophobic fluoro compounds which are soluble in supercritical $CO_2$.

7. The process of claim 6, wherein the dielectric silicone oil is chosen from linear silicone oils of polydimethylsiloxane type and aromatic silicone oils.

8. The process of claim 6, wherein the hydrophobic fluoro compounds which are soluble in supercritical $CO_2$ comprise at least one at least partially fluorinated hydrophobic hydrocarbon-based chain, including at least 6 carbon atoms.

9. The process of claim 8, wherein said hydrophobic fluoro compound comprises, besides at least said hydrophobic hydrocarbon-based chain, at least one group which is capable of interacting via hydrogen bonding or via Van der Waals interaction with the polyamide chains.

10. The process of claim 1, wherein said hydrophobic additive is used in an amount of between 0.2% and 5% by weight relative to the weight of the polyamide-based material.

11. The process of claim 1, comprising:

placing a polyamide-based material filled with silica fibers and/or fillers and at least one hydrophobic additive in an autoclave;

generating supercritical carbon dioxide in the autoclave;

keeping the material in the autoclave in the presence of the supercritical $CO_2$ and of the hydrophobic additive so as to ensure the impregnation of the material with said hydrophobic additive;

recovering the impregnated material by depressurization of the autoclave; and optionally, drying the material thus impregnated.

12. The process of claim 1, wherein the impregnation treatment in supercritical $CO_2$ is performed at a temperature of between 50° C. and 150° C.

13. The process of claim 1, wherein the impregnation treatment in supercritical $CO_2$ is performed at a pressure of between 80 and 450 bar.

14. The process of claim 1, wherein the duration of the impregnation treatment in supercritical $CO_2$ is between 30 and 180 minutes.

15. A polyamide-based material comprising silica fibers and/or fillers and impregnated with at least one hydrophobic additive, obtained via a process of claim 1.

16. The material of claim 15, said material being impregnated with said hydrophobic additive to a thickness extending from the surface of the material down to a depth of at least 200 μm.

17. The material of claim 15, comprising a mass content of said hydrophobic additive of between 0.2% and 5%, relative to the total weight of the material.

18. An electrically insulating component totally or partly formed from a polyamide-based material comprising silica fibers and/or fillers and impregnated with at least one hydrophobic additive, obtained via a process of claim 1.

19. An electrical device comprising at least one electrically insulating component of claim 18.

20. The electrical device of claim 19, said device comprising a sealing enclosure in which are found, besides said electrically insulating component, electrical components and a gaseous medium which ensure the electrical insulation and the extinction of electric arcs that are liable to form in this sealing enclosure.

21. The electrical device of claim 19, said device being a medium-voltage or low-voltage electrical device.

* * * * *